(12) United States Patent
Rob

(10) Patent No.: US 10,562,744 B2
(45) Date of Patent: Feb. 18, 2020

(54) WEAR BLADE INSTALLATION SYSTEM

(71) Applicant: Daniel Rob, Vermillion Bay (CA)

(72) Inventor: Daniel Rob, Vermillion Bay (CA)

( * ) Notice: Subject to any disclaimer, the term of this patent is extended or adjusted under 35 U.S.C. 154(b) by 156 days.

(21) Appl. No.: 15/692,314

(22) Filed: Aug. 31, 2017

(65) Prior Publication Data

US 2019/0062134 A1 Feb. 28, 2019

(51) Int. Cl.
| | |
|---|---|
| *B62B 3/10* | (2006.01) |
| *E01H 5/06* | (2006.01) |
| *B66F 5/02* | (2006.01) |
| *B62B 5/00* | (2006.01) |

(52) U.S. Cl.
CPC ................. *B66F 5/02* (2013.01); *B62B 3/10* (2013.01); *B62B 5/0089* (2013.01); *E01H 5/066* (2013.01); *B62B 2203/10* (2013.01)

(58) Field of Classification Search
CPC .. B62B 1/002; B62B 3/10; B62B 3/12; B62B 5/0089; B66F 5/02; E02F 9/00; E02F 9/0808; E01H 4/02; E01H 5/062; E01H 5/066
USPC ............. 37/231–235; 340/3.1; 254/3 C, 134; 269/17, 51, 58; 280/79.11, 62; 414/589, 414/672
See application file for complete search history.

(56) References Cited

U.S. PATENT DOCUMENTS

| | | | |
|---|---|---|---|
| 3,275,166 A * | 9/1966 | Shannon | E02F 9/00 254/3 C |
| 3,941,400 A | 3/1976 | Buttner | |
| 4,887,838 A * | 12/1989 | Reppen | E01H 5/066 280/656 |
| 5,050,898 A * | 9/1991 | Petrell, Jr. | B62B 3/10 280/79.11 |
| 5,335,923 A | 8/1994 | Langenback et al. | |
| 6,059,512 A | 5/2000 | Kielinski | |
| 6,241,227 B1 | 6/2001 | Berdan et al. | |
| 6,409,151 B1 * | 6/2002 | Cormier | B66F 15/00 254/119 |
| D475,829 S * | 6/2003 | DiStaulo | D34/28 |
| 6,654,998 B1 * | 12/2003 | Berdan | B62B 3/108 269/17 |
| 7,225,520 B1 | 6/2007 | Lorenz et al. | |
| D688,021 S | 8/2013 | Gann et al. | |
| 8,505,934 B2 | 8/2013 | Rodney | |
| 9,347,193 B2 * | 5/2016 | Pogorzelski | E01H 4/023 |
| 2012/0319369 A1 | 12/2012 | Miller | |

* cited by examiner

Primary Examiner — Robert E Pezzuto

(57) ABSTRACT

A wear blade installation system for mounting a wear blade on a plow includes a wear blade that may be installed on a plow. A floor jack is provided and the floor jack may be manipulated. The floor jack has a lift arm and the lift arm has a lift plate. The lift plate is selectively raised and lowered. A lifting unit is coupled to the floor jack and the lifting unit is positioned on the lift plate. A gripping unit is movably coupled to the lifting unit. The gripping unit selectively engages the wear blade thereby facilitating the floor jack to lift the wear blade. In this way the wear blade is positioned to be installed on the plow.

15 Claims, 6 Drawing Sheets

WEAR BLADE INSTALLATION SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIE THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to installation devices and more particularly pertains to a new installation device for mounting a wear blade on a plow.

BRIEF SUMMARY OF THE INVENTION

An embodiment of the disclosure meets the needs presented above by generally comprising a wear blade that may be installed on a plow. A floor jack is provided and the floor jack may be manipulated. The floor jack has a lift arm and the lift arm has a lift plate. The lift plate is selectively raised and lowered. A lifting unit is coupled to the floor jack and the lifting unit is positioned on the lift plate. A gripping unit is movably coupled to the lifting unit. The gripping unit selectively engages the wear blade thereby facilitating the floor jack to lift the wear blade. In this way the wear blade is positioned to be installed on the plow.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
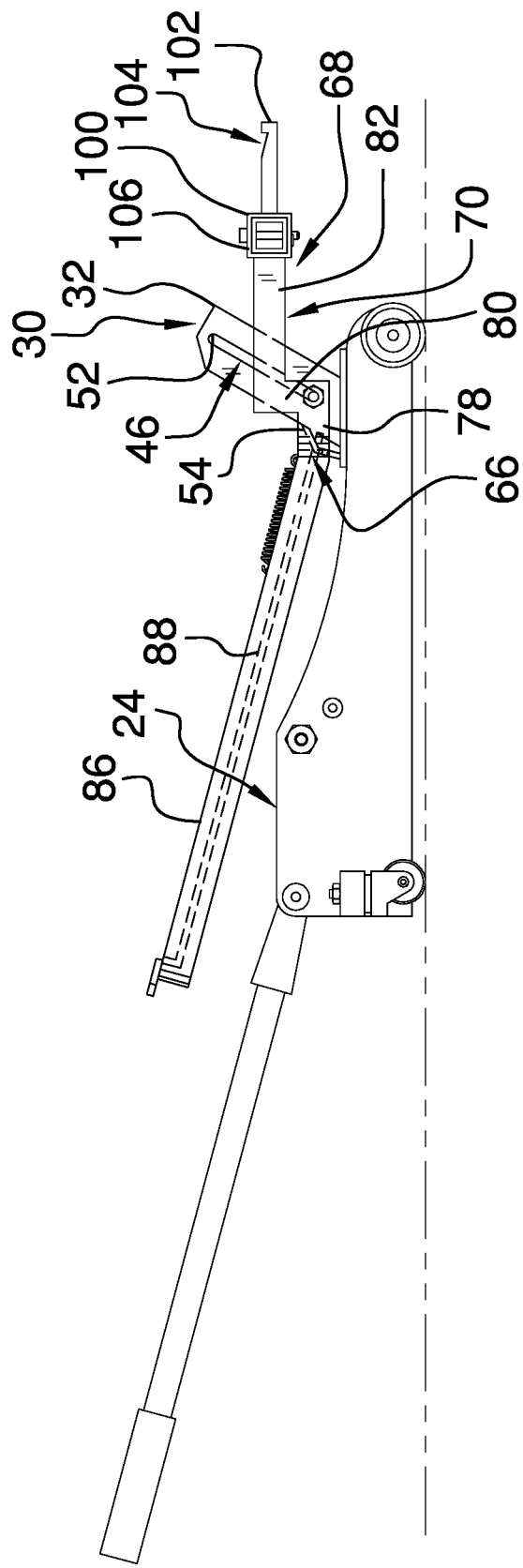
FIG. 1 is a right side view of a wear blade installation system according to an embodiment of the disclosure.
Figure 2:
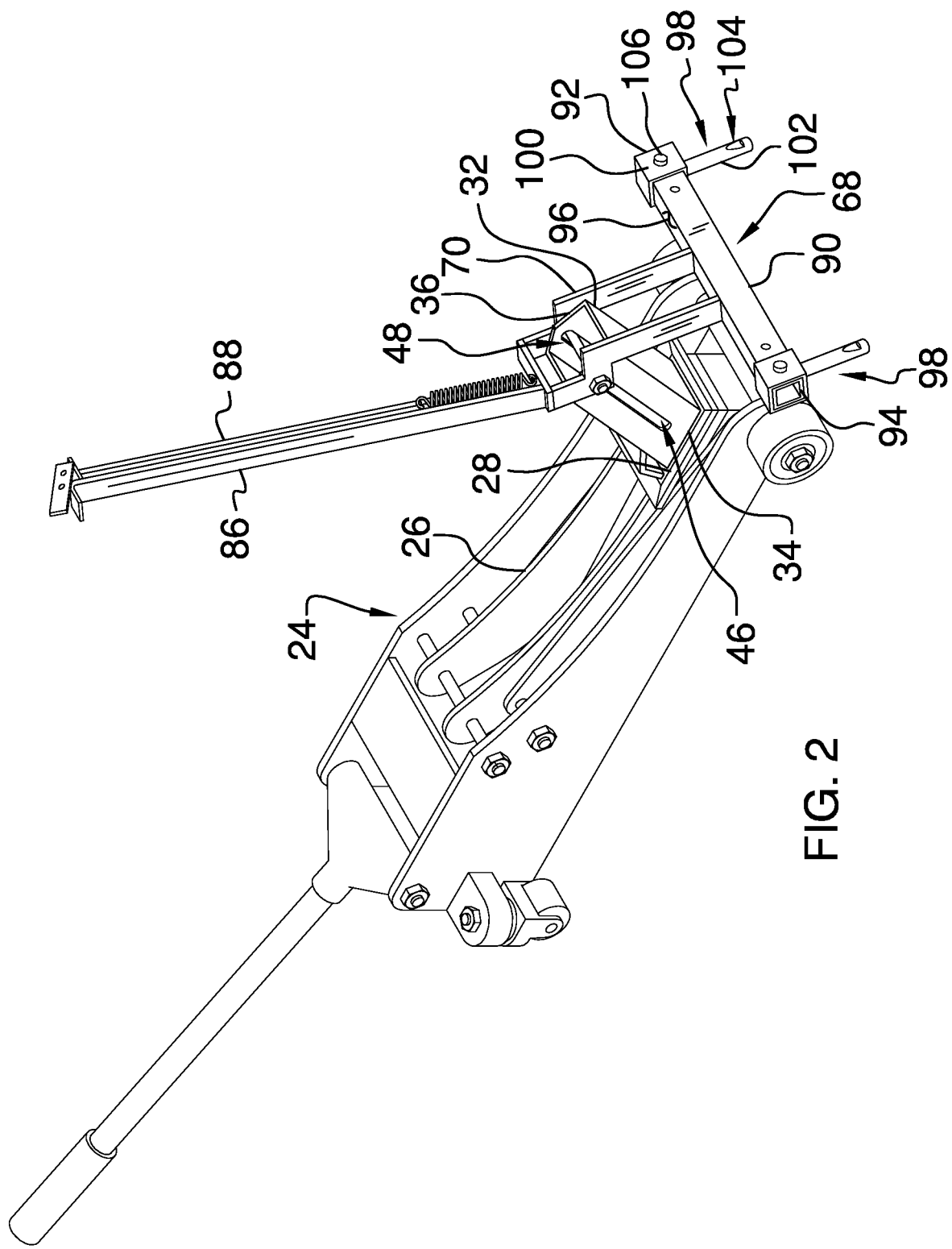
FIG. 2 is a front perspective view of an embodiment of the disclosure showing a yoke in an engaging position.
Figure 3:
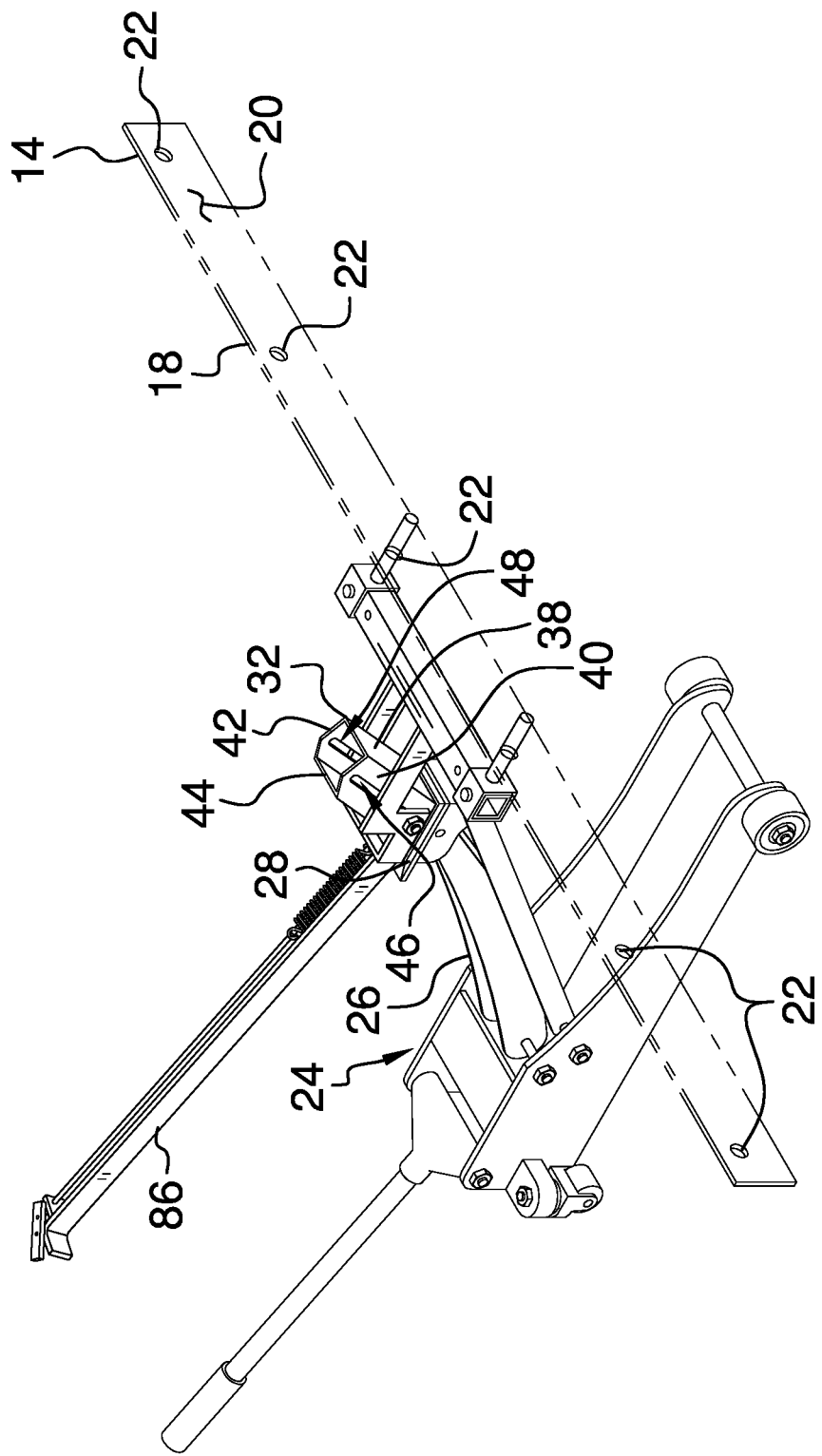
FIG. 3 is a front perspective view of an embodiment of the disclosure showing a yoke in a lifting position.
Figure 4:
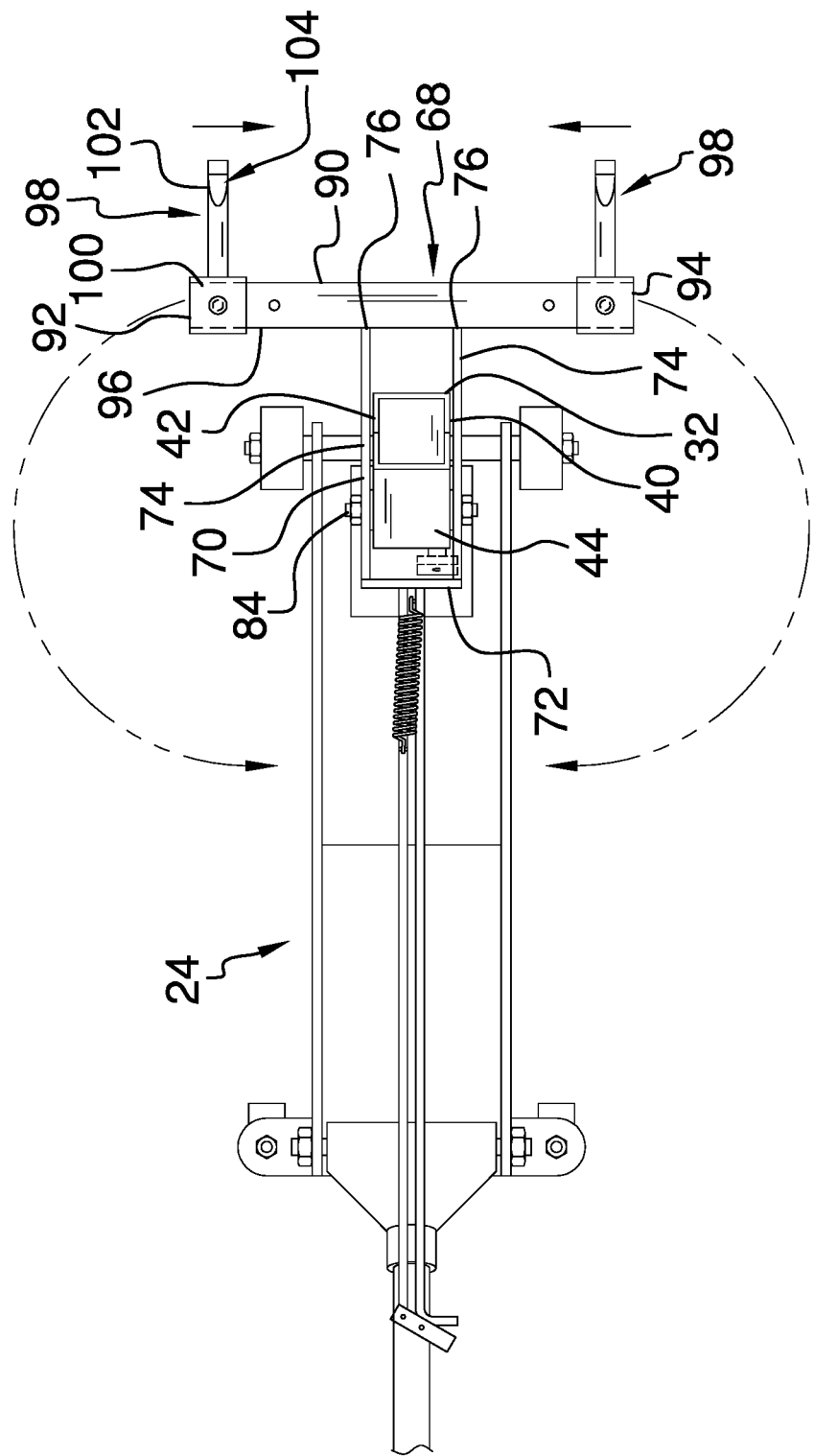
FIG. 4 is a top view of an embodiment of the disclosure.
Figure 5:
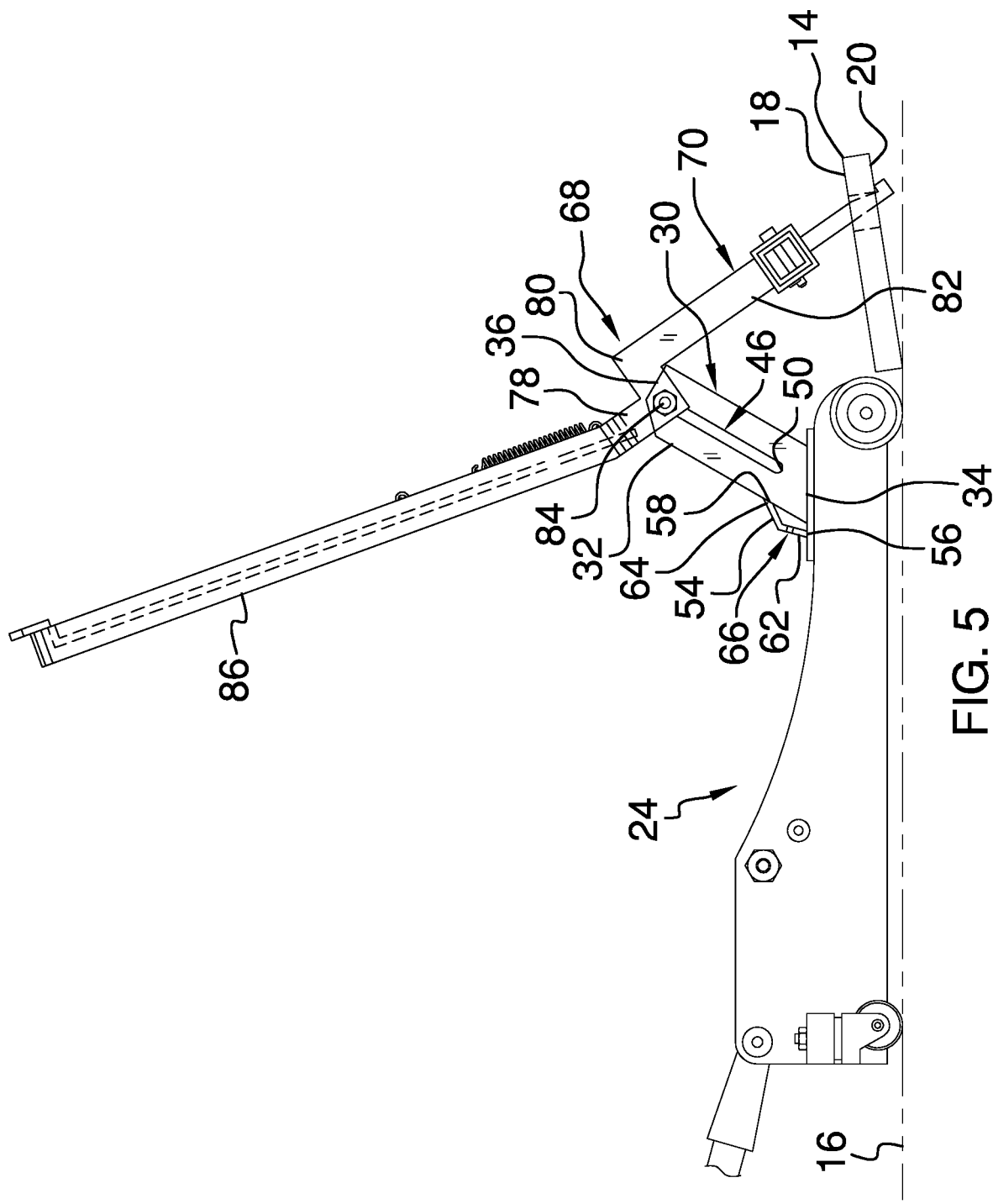
FIG. 5 is a right side view of an embodiment of the disclosures showing a yoke in an engaging position.
Figure 6:
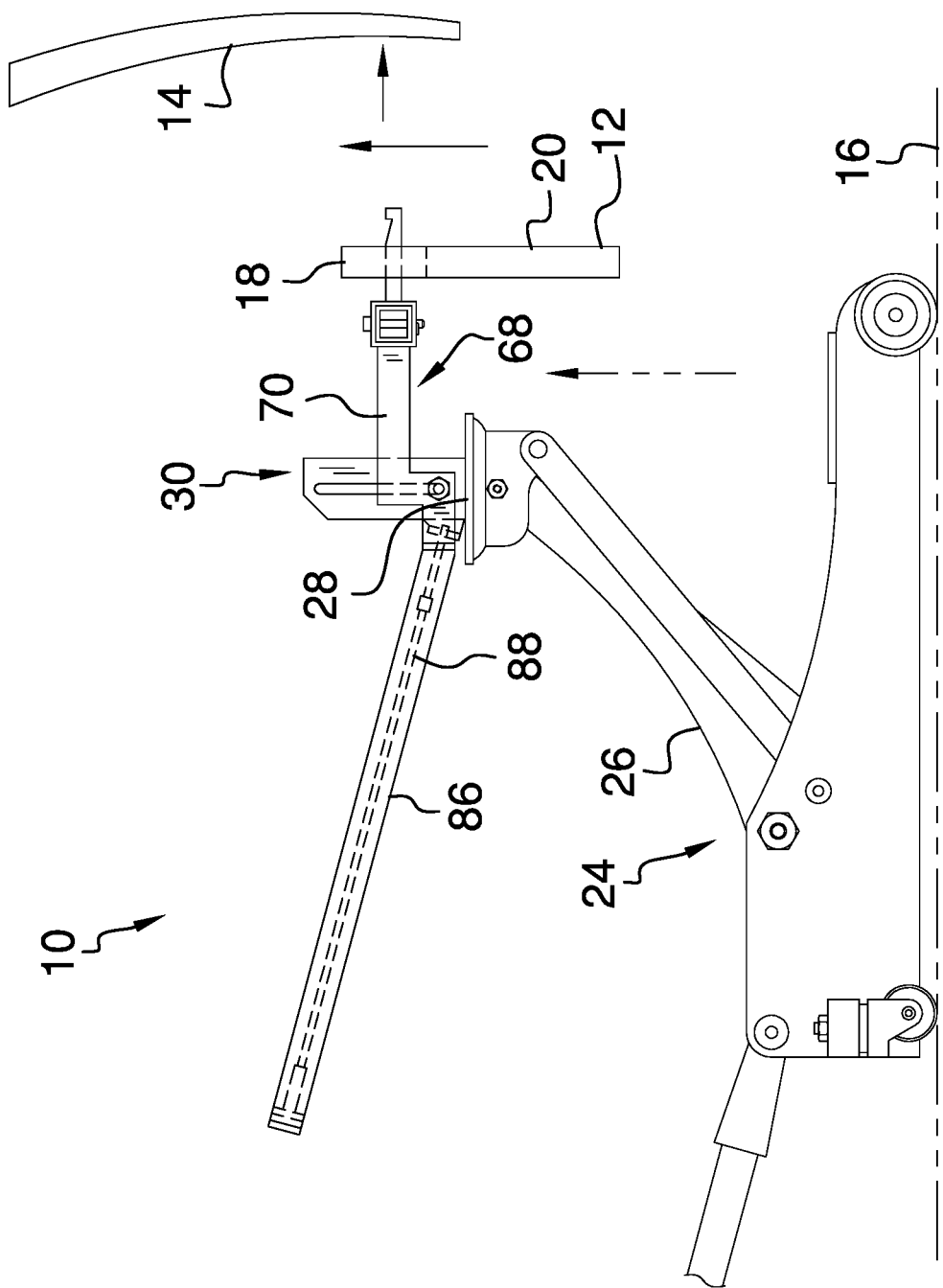
FIG. 6 is a right side view of an embodiment of the disclosure showing a yoke in a lifting position.

With reference now to the drawings, and in particular to FIGS. 1 through 6 thereof, a new installation device embodying the principles and concepts of an embodiment of the disclosure and generally designated by the reference numeral 10 will be described.

As best illustrated in FIGS. 1 through 6, the wear blade installation system 10 generally comprises a wear blade 12 that may be installed on a plow 14. The plow 14 may be a snow plow, a grader plow or any other plow employed to urge material along a support surface 16. The support surface 16 may be ground and the material may be dirt, snow or any other material that commonly collects on the ground.

The wear blade 12 has a front surface 18 and a back surface 20. Moreover, the wear blade 12 has a plurality of apertures 22 extending through the front surface 18 and the back surface 20. The apertures 22 are spaced apart from each other and are distributed along the wear blade 12. The wear blade 12 may be a wear blade of any conventional design that is employed in conjunction with the plow 14.

A floor jack 24 is provided and the floor jack 24 is selectively manipulated to lift an object. The floor jack 24 has a lift arm 26 and the lift arm 26 has a lift plate 28. The lift plate 28 is selectively raised and lowered when the floor jack 24 is manipulated. The floor jack 24 may be a hydraulic floor jack of any conventional design and the lift plate 28 is rotatably coupled to the lift arm 26.

A lifting unit 30 is provided and the lifting unit 30 is coupled to the floor jack 24. The lifting unit 30 is positioned on the lift plate 28 such that the lifting unit 30 is rotatable on the floor jack 24. The lifting unit 30 comprises a tube 32 that has a first end 34, a second end 36 and an outer wall 38 extending therebetween. The outer wall 38 has a first lateral side 40, a second lateral side 42 and a back side 44. The first lateral side 40 has a first slot 46 extending therethrough and the first slot 46 extends substantially between the first end 34 and the second end 36. The second lateral side 42 has a second slot 48 extending therethrough and the second slot 48 extends substantially between the first end 34 and the second end 36.

The first slot 46 is aligned with the second slot 48 and each of the first slot 46 and the second slot 48 has a lower bounding edge 50 and an upper bounding edge 52. The first end 34 of the tube 32 is coupled to the lift plate 28 having the tube 32 extending upwardly from and angling forwardly from the lift plate 28.

A ramp 54 is provided that has a primary end 56 and a secondary end 58. The ramp 54 has a bend 60 thereon to define a first portion 62 forming an angle with respect to a second portion 64. The primary end 56 is coupled to the lift plate 28 and the secondary end 58 is coupled to the back side 44 of the tube 32. The first portion 62 has an opening 66 extending therethrough.

A gripping unit 68 is provided and the gripping unit 68 is movably coupled to the lifting unit 30. The gripping unit 68 selectively engages the wear blade 12 thereby facilitating the floor jack 24 to lift the wear blade 12. In this way the wear blade 12 is positioned to be installed on the plow 14.

The gripping unit 68 comprises a yoke 70 that has a rear member 72 and a pair of lateral members 74 each extending away from the rear member 72. The lateral members 74 are spaced apart from each other and each of the lateral members 74 has a distal end 76 with respect to the rear member 72. Each of the lateral members 74 has a first section 78 extending forwardly from the rear member 72, a central section 80 extending upwardly from the first section 78 and a second section 82 extending forwardly from the central section 80.

A bolt 84 extends through each of the lateral members 74 and each of the first slot 46 and the second slot 48 in the tube 32. In this way the yoke 70 is slidably coupled to the tube 32. The bolt 84 is positioned at an intersection between the first section 78 and the central section 80 corresponding to each of the lateral members 74. The yoke 70 is selectively positioned in an engaging position having the bolt 84 abutting the upper bounding edge 52 corresponding to the each of first slot 46 and the second slot 48. Moreover, the yoke 70 is selectively positioned in a lifting position having the bolt 84 abutting the lower bounding edge 50 corresponding to each of the first slot 46 and the second slot 48.

A handle 86 is coupled to and extends rearwardly away from the rear member 72 of the yoke 70 and the handle 86 may be gripped. The yoke 70 is selectively urged between the lifting position and the engaging position when the handle 86 is manipulated. A lock 88 is slidably coupled to the handle 86 and the lock 88 is coextensive with the handle 86. The lock 88 frictionally engages the second portion 64 of the ramp 54 when the yoke 70 is urged into the lifting position. Moreover, the lock 88 engages the opening 66 in the ramp 54 when the yoke 70 is fully positioned in the lifting position such that the yoke 70 is retained in the lifting position. The lock 88 may comprise a spring loaded rod or the like.

A bar 90 is provided that has a first end 92, a second end 94 and a rear surface 96. The rear surface 96 is coupled to the distal end 76 corresponding to each of the lateral members 74 of the yoke 70 such that the bar 90 is oriented perpendicular to the lateral members 74. A pair of grips 98 is provided and each of the grips 98 is slidably coupled to the bar 90. Each of the grips 98 engages the wear blade 12 when the yoke 70 is positioned in the engaging position. In this way the floor jack 24 may lift the wear blade 12 when the yoke 70 is positioned in the lifting position.

Each of the grips 98 comprises a collar 100 that is slidably positioned around the bar 90. A peg 102 is coupled to and extends forwardly from the collar 100. The peg 102 extends through a selected one of the apertures 22 in the wear blade 12 when the yoke 70 is positioned in the engaging position. The peg 102 has a notch 104 therein and the notch 104 engages the wear blade 12. In this way the wear blade 12 is inhibited from sliding off of the peg 102 when the yoke 70 is urged into the lifting position. A pin 106 extends through the collar 100 and engages the bar 90 to retain the collar 100 at a selected point along the bar 90.

In use, the wear blade 12 is laid on the support surface 16 having the back surface 20 of the wear blade 12 abutting the support surface 16. The floor jack 24 is positioned adjacent to the wear bar 90 and the handle 86 is manipulated to position the yoke 70 in the gripping position. The lifting unit is rotated on the floor jack 24 to position each of the grips in a selected orientation with respect to the floor jack 24. The floor jack 24 is manipulated to urge the pin 106 corresponding to each of the grips 98 to extend though a selected one of the apertures 22 in the wear blade 12. The handle 86 is manipulated to urge the yoke 70 in the lifting position thereby orienting the yoke 70 parallel to the support surface 16. In this way the peg 102 corresponding to each of the grips 98 lifts the wear blade 12 from the support surface 16.

The bolt 84 slides downwardly in each of the first slot 46 and the second slot 48 and the lock 88 engages the opening 66 in the ramp 54 when the yoke 70 is urged into the lifting position. In this way the yoke 70 is releasably retained in the lifting position. The floor jack 24 is manipulated to lift the wear blade 12 to a selected height thereby facilitating the wear bar 90 to be attached to the plow 14. In this way a single individual is facilitated to lift and install the wear blade 12 without the risk of injury.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A wear blade installation system comprising:
  a wear blade being configured to be installed on a plow, said wear blade having a front surface and a back surface, said wear blade having a plurality of apertures extending through said front surface and said back surface, said apertures being spaced apart from each other and being distributed along said wear blade;
  a floor jack being configured to be manipulated, said floor jack having a lift arm, said lift arm having a lift plate, said lift plate being selectively raised and lowered;
  a lifting unit being coupled to said floor jack, said lifting unit being positioned on said lift plate, said lifting unit comprising a tube having a first end, a second end, and an outer wall extending therebetween, said outer wall having a first lateral side, a second lateral side and a back side, said first end being coupled to said lift plate having said tube extending upwardly from and angling forwardly from said lift plate, said first lateral side having a first slot extending therethrough, said first slot extending substantially between said first end and said second end; and a gripping unit being movably coupled to said lifting unit, said gripping unit selectively engaging said wear blade thereby facilitating said floor jack to lift said wear blade wherein said wear blade is configured to be installed on the plow.

2. The system according to claim 1, wherein said second lateral side has a second slot extending therethrough, said second slot extending substantially between said first end and said second end, said first slot being aligned with said second slot, each of said first slot and said second slot having a lower bounding edge and an upper bounding edge.

3. The system according to claim 1, further comprising a ramp having a primary end and a secondary end, said ramp having a bend thereon to define a first portion forming an angle with respect to a second portion, said primary end being coupled to said lift plate, said secondary end being coupled to said back side of said tube, said first portion having an opening extending therethrough.

4. The system according to claim 1, wherein said gripping unit comprises a yoke having a rear member and a pair of lateral members each extending away from said rear member, said lateral members being spaced apart from each other, each of said lateral members having a distal end with respect to said rear member.

5. The system according to claim 4, further comprising each of said lateral members has a first section extending forwardly from said rear member, a central section extending upwardly from said first section and a second section extending forwardly from said central section.

6. The system according to claim 5, further comprising:
a tube having a first slot and a second slot, each of said first slot and said second slot having a lower bounding edge and an upper bounding edge; and
a bolt extending through each of said lateral members and each of said first slot and said second slot in said tube such that said yoke is slidably coupled to said tube, said bolt being positioned at an intersection between said first section and said central section corresponding to each of said lateral members.

7. The system according to claim 6, wherein said yoke is selectively positioned in an engaging position having said bolt abutting said upper bounding edge corresponding to said each of first slot and said second slot, said yoke being selectively positioned in a lifting position having said bolt abutting said lower bounding edge corresponding to each of said first slot and said second slot.

8. The system according to claim 7, further comprising a handle being coupled to and extending rearwardly away from said rear member of said yoke wherein said handle is configured to be gripped, said yoke being selectively urged between said lifting position and said engaging position when said handle is manipulated.

9. The system according to claim 8, further comprising:
a ramp having a second portion and an opening; and
a lock being slidably coupled to said handle, said lock being coextensive with said handle, said lock frictionally engaging said second portion of said ramp when said yoke is urged into said lifting position, said lock engaging said opening in said ramp when said yoke is fully positioned in said lifting position such that said yoke is retained in said lifting position.

10. The system according to claim 4, further comprising a bar having a first end, a second end and a rear surface, said rear surface being coupled to said distal end corresponding to each of said lateral members of said yoke having said bar being oriented perpendicular to said lateral members.

11. The system according to claim 10, further comprising a pair of grips, each of said grips being slidably coupled to said bar, each of said grips engaging said wear blade when said yoke is positioned in an engaging position thereby facilitating said floor jack to lift said wear blade when said yoke is positioned in a lifting position.

12. The system according to claim 11, further comprising each of said grips comprises a collar being slidably positioned around said bar.

13. The system according to claim 12, further comprising:
a plurality of apertures each extending through said wear blade; and
a peg being coupled to and extending forwardly from said collar, said peg extending through a selected one of said apertures in said wear blade when said yoke is positioned in said engaging position, said peg having a notch therein, said notch engaging said wear blade thereby inhibiting said wear blade from sliding off of said peg when said yoke is urged into said lifting position.

14. The system according to claim 12, further comprising a pin extending through said collar and engaging said bar to retain said collar at a selected point along said bar.

15. A wear blade installation system comprising:
a wear blade being configured to be installed on a plow, said wear blade having a front surface and a back surface, said wear blade having a plurality of apertures extending through said front surface and said back surface, said apertures being spaced apart from each other and being distributed along said wear blade;
a floor jack being configured to be manipulated, said floor jack having a lift arm, said lift arm having a lift plate, said lift plate being selectively raised and lowered;
a lifting unit being coupled to said floor jack, said lifting unit being positioned on said lift plate, said lifting unit comprising:
a tube having a first end, a second end, and an outer wall extending therebetween, said outer wall having a first lateral side, a second lateral side and a back side, said first lateral side having a first slot extending therethrough, said first slot extending substantially between said first end and said second end, said second lateral side having a second slot extending therethrough, said second slot extending substantially between said first end and said second end, said first slot being aligned with said second slot, each of said first slot and said second slot having a lower bounding edge and an upper bounding edge, said first end being coupled to said lift plate having said tube extending upwardly from and angling forwardly from said lift plate, and
a ramp having a primary end and a secondary end, said ramp having a bend thereon to define a first portion forming an angle with respect to a second portion, said primary end being coupled to said lift plate, said secondary end being coupled to said back side of said tube, said first portion having an opening extending therethrough; and
a gripping unit being movably coupled to said lifting unit, said gripping unit selectively engaging said wear blade thereby facilitating said floor jack to lift said wear blade wherein said wear blade is configured to be installed on the plow, said gripping unit comprising:

a yoke having a rear member and a pair of lateral members each extending away from said rear member, said lateral members being spaced apart from each other, each of said lateral members having a distal end with respect to said rear member, each of said lateral members having a first section extending forwardly from said rear member, a central section extending upwardly from said first section and a second section extending forwardly from said central section, a bolt extending through each of said lateral members and each of said first slot and said second slot in said tube such that said yoke is slidably coupled to said tube, said bolt being positioned at an intersection between said first section and said central section corresponding to each of said lateral members, said yoke being selectively positioned in an engaging position having said bolt abutting said upper bounding edge corresponding to said each of first slot and said second slot, said yoke being selectively positioned in a lifting position having said bolt abutting said lower bounding edge corresponding to each of said first slot and said second slot, a handle being coupled to and extending rearwardly away from said rear member of said yoke wherein said handle is configured to be gripped, said yoke being selectively urged between said lifting position and said engaging position when said handle is manipulated, a lock being slidably coupled to said handle, said lock being coextensive with said handle, said lock frictionally engaging said second portion of said ramp when said yoke is urged into said lifting position, said lock engaging said opening in said ramp when said yoke is fully positioned in said lifting position such that said yoke is retained in said lifting position, a bar having a first end, a second end and a rear surface, said rear surface being coupled to said distal end corresponding to each of said lateral members of said yoke having said bar being oriented perpendicular to said lateral members; and a pair of grips, each of said grips being slidably coupled to said bar, each of said grips engaging said wear blade when said yoke is positioned in said engaging position thereby facilitating said floor jack to lift said wear blade when said yoke is positioned in said lifting position, each of said grips comprising:

a collar being slidably positioned around said bar, a peg being coupled to and extending forwardly from said collar, said peg extending through a selected one of said apertures in said wear blade when said yoke is positioned in said engaging position, said peg having a notch therein, said notch engaging said wear blade thereby inhibiting said wear blade from sliding off of said peg when said yoke is urged into said lifting position, and a pin extending through said collar and engaging said bar to retain said collar at a selected point along said bar.

\* \* \* \* \*